United States Patent
Hong et al.

(10) Patent No.: US 10,262,097 B2
(45) Date of Patent: Apr. 16, 2019

(54) METHOD TO OPTIMIZE STANDARD CELLS MANUFACTURABILITY

(71) Applicants: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

(72) Inventors: Lin Hong, Shanghai (CN); Xue Li, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 59 days.

(21) Appl. No.: 15/483,516

(22) Filed: Apr. 10, 2017

(65) Prior Publication Data
US 2017/0300609 A1    Oct. 19, 2017

(30) Foreign Application Priority Data
Apr. 18, 2016    (CN) .......................... 2016 1 0240598

(51) Int. Cl.
*G06F 17/50*    (2006.01)

(52) U.S. Cl.
CPC ........ *G06F 17/5077* (2013.01); *G06F 17/504* (2013.01); *G06F 17/5081* (2013.01); *G06F 2217/12* (2013.01); *Y02P 90/265* (2015.11)

(58) Field of Classification Search
CPC ...................................................... G06F 17/00
USPC ............................................................ 716/51
See application file for complete search history.

(56) References Cited

U.S. PATENT DOCUMENTS

| | | | |
|---|---|---|---|
| 2002/0108095 A1* | 8/2002 | Barney | G06F 17/5068 716/122 |
| 2008/0120586 A1 | 5/2008 | Hoerold | |
| 2015/0143309 A1 | 5/2015 | De Dood et al. | |
| 2017/0300609 A1* | 10/2017 | Hong | G06F 17/504 |

OTHER PUBLICATIONS

European Application No. 17166522.7, Office Action dated Jun. 21, 2018, 7 pages.

(Continued)

*Primary Examiner* — Mohammed Alam
(74) *Attorney, Agent, or Firm* — Kilpatrick Townsend & Stockton LLP

(57) ABSTRACT

A method for optimizing manufacturability of standard cells includes generating random contexts for the standard cells, inserting vias into the standard cells, and performing a lithography verification on the standard cells after the vias have been inserted. The method enables early detection and resolution of potential hot spots on standard cell pin connections and reduction of hot spots that are introduced by the router at the chip level. The early detection and reduction of hot spots shortens the cycle time of a standard-cell based design.

20 Claims, 4 Drawing Sheets

(56) References Cited

OTHER PUBLICATIONS

Tong et al., An Automatic Optical Simulation-Based Lithography Hotspot Fix Flow for Post-Route Optimization, IEEE Transactions on Computer-Aided Design of Integrated Circuits and Systems, vol. 29, Issue 5, May 2010, pp. 671-684.
European Application No. 17166522.7, Extended European Search Report dated Sep. 11, 2017, 12 pages.
Salem et al., A DFM tool for analyzing lithography and stress effects on standard cells and critical path performance in 45nm digital designs, Design and Test Workshop (IDT), $5^{th}$ International IEEE, Dec. 14, 2010, pp. 13-17.
Wikipedia, Design rule checking, Available online at: https://en.wikipedia.org/w/index.php?title= Design_rule_ checking&oldid= 709033430, Mar. 8, 2016, 3 pages.
Wuu et al., Detecting Context Sensitive Hot Spots in Standard Cell Libraries, Design for manufacturability through design-process integration III, 2009, 9 pages.

\* cited by examiner

METHOD TO OPTIMIZE STANDARD CELLS MANUFACTURABILITY

CROSS-REFERENCES TO RELATED APPLICATIONS

This application claims priority to Chinese patent application No. 201610240598.0, filed on Apr. 18, 2016, the content of which is incorporated herein by reference in its entirety.

FIELD OF THE INVENTION

The present invention relates generally to semiconductor technology. More particularly, embodiments of the present invention relate to methods and systems for optimizing standard cells manufacturability.

BACKGROUND OF THE INVENTION

With advanced designs of digital integrated circuits, standard cell design libraries are also constantly progressing. Manufacturing processes in nanotechnology encounter many manufacturability problems, and design processes of integrated circuits also encounter multiple problems, which ultimately affect the yield of integrated circuits. In general, a standard-cell based design is implemented using a set of predefined logic cells referred to as standard cells. The set of standard cells is referred to as a standard cell library. A standard cell library may contain the following components: layout of the cells, Verilog models or VHDL models, parasitic extraction models, DRC rule decks. Each standard cell has a unique logic function (e.g., a D-flipflop, a NAND gate, a NOR gate, etc.). In a standard-cell based design, a standard cell may be instantiated multiple times and an integrated circuit design is implemented by using a placement and routing tool to place all instantiated standard cells and interconnect (routing) them. Thus, optimizing the manufacturability of a standard cell library is a critical step to improve the design flow of integrated circuits.

In conventional physical implementation flows of standard-cell based designs, an engineer can only perform a lithography verification simulation of a standard-cell based design, but cannot predict lithography hot spots after the standard-cell based design has been physically implemented. In a physical implementation, a router may add one or more vias to a standard cell pin to connect the standard cell, which may create hard-to-solve lithography hot spots. A layout engineer is required to spend significant time and effort to resolve hot spots that occur on the pin connections of the standard cell.

BRIEF SUMMARY OF THE INVENTION

Embodiments of the present invention provide a novel method for optimizing manufacturability of standard cells. The method may include generating random contexts for the standard cells, inserting vias into the standard cells, and performing a lithography verification on the standard cells after the vias have been inserted.

The method may further include, prior to generating the random contexts, extracting the standard cells from an original library, and marking pin connections on a layer of each standard cell.

In an embodiment, generating the random contexts includes placing the standard cells in a library.

In an embodiment, inserting the vias into the standard cells includes generating a via insertion deck containing a plurality of via insertion rules for the vias, and placing the vias on pin connections of the standard cells according to a set of design rules.

In an embodiment, inserting the vias into the standard cells further include applying different via insertion rules in response to different wiring patterns.

In an embodiment, the vias are selected from a process library.

Embodiments of the present invention also provide a system for optimizing manufacturability of standard cells. The system includes a context generation module, a via insertion deck module, a lithography verification module.

In an embodiment, the system further includes a cell extraction and pin connection generation module configured to extract the standard cells from an original library and mark pin connections on a layer of each standard cell.

In an embodiment, the context generation module is configured to place the standard cells in a library.

In an embodiment, the via insertion deck module is configured to generate via insertion rules for the vias and place the vias on pin connections of the standard cells according to a set of design rules.

In an embodiment, the via insertion deck module is further configured to apply different via insertion rules based on different wiring patterns.

In an embodiment, the system further includes a via generation module configured to select the vias from a process library.

The following description, together with the accompanying drawings, will provide a better understanding of the nature and advantages of the claimed invention.

DETAILED DESCRIPTION OF THE INVENTION

Figure 1:
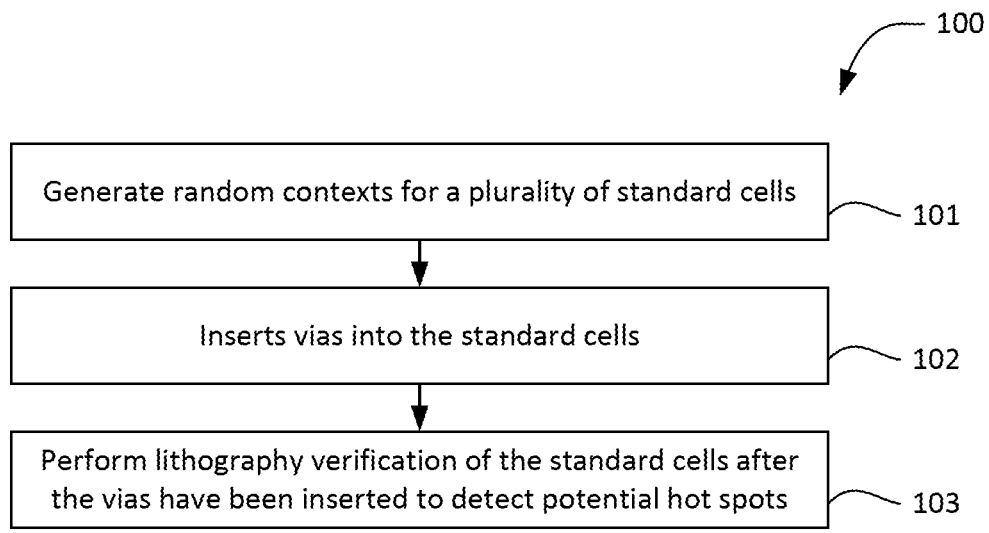
FIG. 1 is a flowchart of a method for optimizing manufacturability of standard cells according to some embodiments of the present invention.

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It will be understood that the drawings are not drawn to scale, and similar reference numbers are used for representing similar elements. Embodiments of the invention are described herein with reference to functional block diagrams that are schematic illustrations of idealized embodiments (and intermediate structures) of the invention.

As used herein, the terms "a", "an" and "the" may include singular and plural references. It will be further understood that the terms "comprising", "including", having", "containing" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

As used herein, the terms "routing" and "wiring" may be used interchangeably. The terms "placement" and "routing" may be used together or interchangeably to refer to a placement of a standard cell and/or a routing of nets between standard cells. The terms "cell", and "standard cell" may be used interchangeably and may be presented in an appropriate format, such as GDSII (GDS file), Library Exchange Format (LEF), Design Exchange Format (DEF), etc. The terms "wiring" and "routing" may be used interchangeably. The terms "routing patterns" and "wiring patterns" may be used interchangeably. The terms "wire," "net," "connection" may be used interchangeably to refer to any structure for transmitting a signal from one point of a standard cell to another. The term "via" is referred to a through hole through an insulating layer that is filled with a conductive material and configured to connect a portion of one layer to a portion of another layer.

Conventional standard cell physical implementation processes have several drawbacks: (1) Photolithography inspection is only performed on a standard cell itself. Even if a standard cell does not have any hot spot, an engineer cannot prevent new hot spots from occurring when a standard cell is used for placement and routing. For example, although no hot spots are detected in the physical verification of a standard cell, hot spots can still be triggered when vias are inserted in pin connections of a standard cell, which cannot be detected and resolved earlier. (2) In order to prevent hot spots from occurring on the pin connections of a standard cell, an engineer may spend significant amount of time and effort to replace and reroute the standard cell, which will affect the tape-out schedule.

Embodiments of the present invention provide a method for optimizing the manufacturability of standard cells, which enables the early detection and resolution of lithography hot spots on a pin connection(s) of the standard cells.

FIG. 1 is a flowchart of a method 100 for optimizing the manufacturability of standard cells according to some embodiments of the present invention.

Referring to FIG. 1, method 100 may include the following steps:

Step 101: generate random contexts for a plurality of standard cells;

Step 102: insert vias into the standard cells;

Step 103: perform lithography verification of the standard cells after the vias have been inserted to detect potential hot spots.

The standard cells in step 101 may include all standard cells extracted from an original GDS file. After all standard cells have been extracted, pin connections may be marked on an extracted layer of the extracted standard cells. In an embodiment, a profile record may be generated for the standard cells, the profile record may contain information about the number of pins used on which metal layer of each standard cell (alternatively referred to as "cell").

In step 101, generating random contexts for the standard cells may involve placing all standard cells in a GDS file as a router would do in a layout implementation.

In an exemplary embodiment, the standard cells may be randomly placed adjacent to each other. For example, standard cells having short pin connections may be placed close to each other, or standard cells having different functions may be placed close to each other, or standard cells having the same function but with different input pins may be placed close to each other. Each placement approach is designed based on how the router will handle the standard cells having different layout characteristics. Each placement approach can help locate weak spots (defect spots, failure spots) of the standard cells.

In step 102, inserting vias into the standard cells may further include generating a via insertion deck containing a plurality of via insertion rules for all available vias and the placement of vias on pin connections of the standard cells according to a set of design rules. The via insertion deck is stored in a computer file and may contain via enclosure rules to ensure that all of the inserted vias satisfy a set of design rules, e.g., Design Rule Check (DRC).

Figure 4:
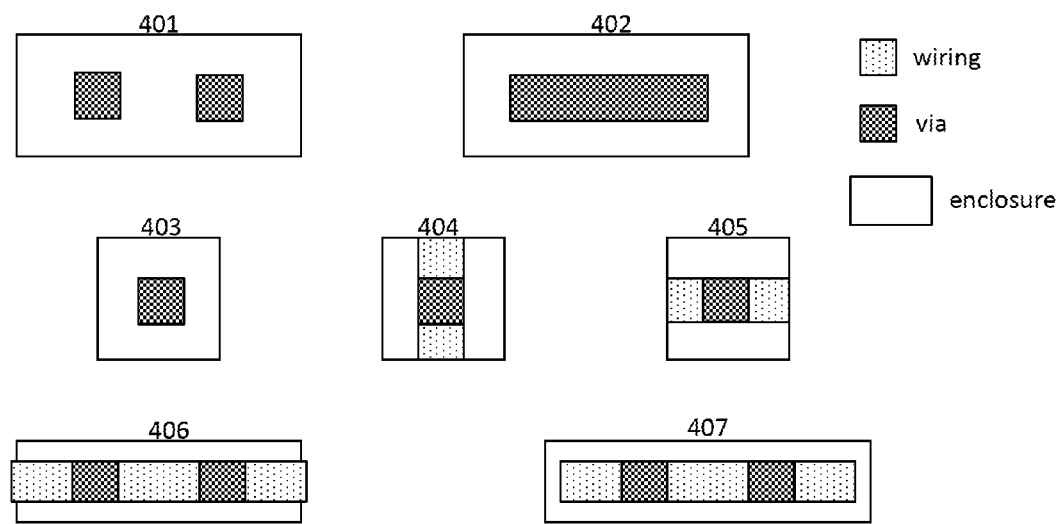
FIG. 4 is a top view of different via designs according to an exemplary embodiment of the present invention.

The available vias can be selected from a technology.lef file. The Library Exchange Format (LEF) file contains building blocks of different standard cells (e.g., flipflop, NAND, NOR, etc.) in layout format and depends on a set of design rules, a particular fab and technology. The technology.lef file is provided by the fab (e.g., foundry) for an integrated circuit (e.g., a standard-based design). For example, the process in step 102 automatically reads geometry data of the vias from the technology.lef file, generates a GDS file for each standard cell, and sorts out all unique via designs (some via designs are shown in FIG. 4). The GDS file and via geometry data can be used in subsequent process steps. All of the vias will be tested for placing into the standard cell pin connections to verify whether or not they will cause manufacturing weak spots. Data of each via geometry will be recorded, and a GDS file will be generated for a user to review what types of via designs are listed in the technology.lef file.

In step 102, inserting vias into the standard cells may further include applying different via insertion rules based on different routing patterns to check for hot spots caused by the inserted vias.

In step 103, a lithography verification is performed on the standard cells after the vias have been inserted, and a verification record for each standard cell is generated.

In some embodiments, a method for optimizing the manufacturability of standard cells can be implemented using an apparatus and system comprising memory and one or more processing units.

In method 100 of the present invention, because different contexts can be generated and different vias can be selected to be inserted into the standard cell pin connection(s) and then photo-lithographically verified, potential hot spots on standard cell pin connections can be detected and addressed early. Reducing hot spots introduced by the router at the chip level will reduce time and effort of a layout engineer to resolve the hot spots, thereby reducing the design cycle time.

Figure 2:
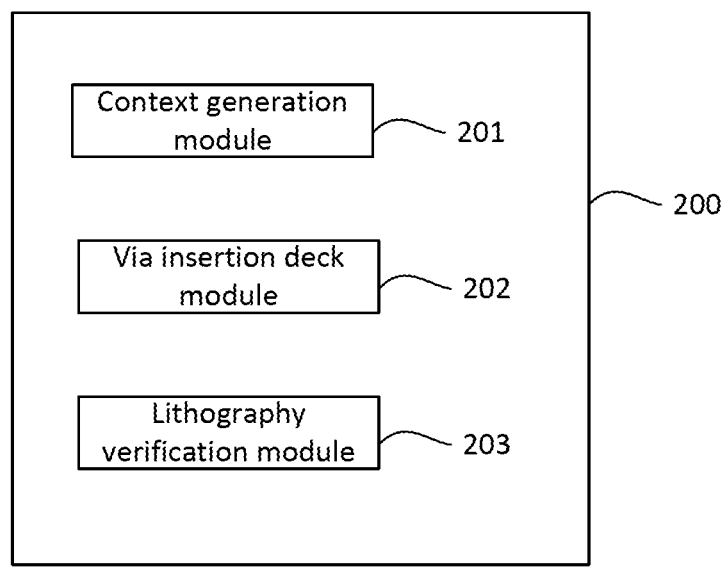
FIG. 2 is simplified schematic block diagram of a system for optimizing manufacturability of standard cells according to an embodiment of the present invention.

Embodiments of the present invention also provide a system for optimizing the manufacturability of standard cells. FIG. 2 is a simplified block diagram of a system 200 for optimizing the manufacturability of standard cells.

Referring to FIG. 2, system 200 may include a context generation module 201, a via insertion module 202, and a lithography verification module 203. Context generation module 201 is configured to generate random contexts for a plurality of standard cells. Via insertion module 202 is configured to insert vias into the standard cells. Lithography verification module 203 is configured to perform lithography verification of the standard cells after the vias have been inserted into the standard cells.

In one embodiment of the present invention, context generation module 201 may be further configured to place all of the standard cells in one GDS file. All of the standard cells may be extracted from an original GDS file. In an exemplary embodiment, contexts generation module 201 may randomly place the standard cells adjacent to each other. For example, context generation module 201 may place standard cells having short pins close to each other, or context generation module 201 may place standard cells having different functions close to each other, or context generation module 201 may place standard cells having the same function but different input pins close to each other. Context generation module 201 is configured to design a corresponding placement approach according to the way the router processes standard cells having different layout characteristics. Each placement approach can help locate weak spots of the standard cells.

In one embodiment of the present invention, via insertion module 202 may further be configured to generate vias insertion rules for all available vias and to place vias on the pin connections of the standard cells according to a set of design rules. Via insertion module 202 may further be configured to apply different vias insertion rules based on different routing patterns.

Lithography verification module 203 may perform photolithography verification of the standard cells after the vias have been inserted and generate a verification record for each standard cell.

In system 200 of the present invention, because context generation module 201 may generate different contexts, via insertion module 202 may select different vias to be inserted into pin connections of the standard cells, and lithography verification module 203 may perform photo-lithography verification, potential hot spots on standard cell pin connections can thus be detected and addressed early by system 200. Reducing hot spots introduced by the router at the chip level will reduce time and effort of a layout engineer to resolve the hot spots, thereby reducing the design cycle time.

Figure 3:
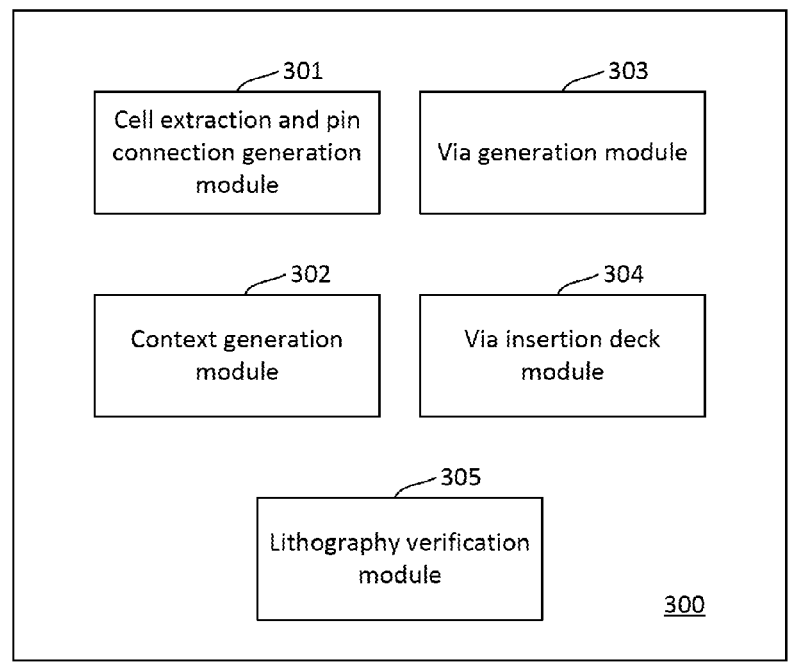
FIG. 3 is simplified schematic block diagram of a system for optimizing manufacturability of standard cells according to another embodiment of the present invention.

FIG. 3 is a simplified block diagram of a system 300 for optimizing manufacturability of standard cells according to an embodiment of the present invention. Referring to FIG. 3, system 300 may include a standard cell extraction and pin connection generation module 301, a context generation module 302, a via generation module 303, a via insertion deck module 304, and a lithography verification module 305. Cell extraction and pin connection generation module 301 is configured to extract all standard cells from an original library (e.g., GDS) file and to mark a pin connection(s) for a layout layer of the extracted standard cells. Cell extraction and pin connection generation module 301 is further configured to generate a summary report that contains information, such as the number of pin connections that are used on a layer of each standard cell or the number of pin connections for each layer of the layout of each standard cell. Contexts generation module 302 is configured to generate random contexts for the standard cells. Context generation module 302 is further configured to place the standard cells into a GDS file as a router would do in the physical implementation. Via generation module 303 is configured to select all available vias from a technology.lef file. Via insertion deck module 304 is configured to insert vias into the standard cells. Lithography verification module 305 is configured to perform lithography verification of the standard cells after the vias have been inserted.

As described above, cell extraction and pin connection generation module 301 may extract all standard cells from the original GDS file. Cell extraction and pin connection generation module 301 may also generate a cell profile record that may contain information about the number of pins used for which metal layer for each standard cell.

Context generation module 302 may be further configured to place all standard cells in one GDS file. The context may be randomly generated or it can be user defined for a given GDS file. In an exemplary embodiment, context generation module 302 may randomly place the standard cells adjacent to each other. For example, context generation module 302 may place standard cells having short pin connections close to each other, or context generation module 302 may place standard cells having different functions close to each other, or context generation module 302 may place standard cells having the same function but different input pins close to each other. Context generation module 302 is also configured to design a corresponding placement approach according to the way the router processes standard cells having different layout characteristics. Each placement approach can help locate weak spots of the standard cells.

Via generation module 303 can automatically select all available vias from a technology.lef file. For example, via generation module 303 can automatically read via geometry information (data) from the technology.lef file and generate a via GDS file for each standard cell and sort out (classify) all unique via designs. The via GDS file and via geometry information will be used in subsequent steps, as the vias will be tested as they are placed into the pin connections of the standard cells to check whether they may cause manufacturing weak spots. Information of each via geometry will be recorded, and a GDS file will be generated for a user to review or check what types of via designs are listed in the technology.lef file.

Via insertion deck module 304 is configured to generate vias insertion rules for all vias to place vias on the standard cells according to a set of design rules. Vias insertion deck module 304 is further configured to apply different via insertion rules based on different wiring patterns. Vias insertion deck module 304 is further configured to ensure that the locations of the inserted vias comply with the set of design rules. For example, if via insertion deck module 304 determines that an additional via is required in a standard cell, via insertion deck module 304 checks the locations adjacent to existing vias and pin connections so that the additional via will not violate the set of design rules. When an allowable location or allowable locations are determined (identified), the via(s) will be inserted by vias insertion deck module 304.

In an embodiment, via insertion deck module 304 may contain one or more algorithms that converts via enclosure rules into the insertion rules to ensure that the inserted vias satisfies the set of design rules (DRC). Via insertion module 304 may specify the router to add geometries in metal 1 to metal 1 (M1 to M1) pins. Via insertion deck module 304 may specify the router to perform local routing to the pin(s) or dropping vias. Via insertion deck module 304 may specify the router to extend pin connections and then make the metal 2 to metal 1 connection. Via insertion deck module 304 may apply different via insertion rules based on the chosen routing approach.

Via insertion deck module 304 contains a description of each layer in the standard cell design that requires validation of the various aspects of manufacturability and process requirements of the vias. The via insertion deck module ensures that the locations of the inserted vias comply with the set of design rules. For example, if the via insertion deck module determines that additional vias are required in the standard cells, the via insertion deck module checks the locations adjacent to existing vias and the pin connections so that an additional via will not violate the set of design rules. When the allowable locations are identified, vias will be inserted by the via insertion deck module.

Lithography verification module 305 performs lithography verification on standard cells after the vias have been inserted, and generates a verification record for each standard cell.

FIG. 4 is a top (plan) view of different via designs according to an exemplary embodiment of the present invention. Referring to FIG. 4, via designs 401, 402, 403, 404, 405, 406, and 407 are defined in a technology.lef file. For example, vias 401, 406 and 407 have a dual-via structure, vias 402, 403, 404, 405 are single vias. The different via designs are associated with corresponding enclosures. Different enclosures are applied to the different via designs. The set of design rules will check the enclosure rules to ensure that the standard-cell based design or integrated circuit is free of DRC violations.

In an exemplary embodiment, a total number of 300 contexts that have 209,400 cell placements were generated in a GDS file, a total number of 2,039,245 vias were inserted into the GDS file. After the lithography verification simulation, four standard cells having hot spot connection structures were found. A layout designer or an intellectual property (IP) designer may address these four standard cells based on the hot spot connection structures and a list of the standard cells containing the hot spots, so that the design will be free of hot spots.

According to embodiments of the present invention, system 300 may be used to detect and resolve potential hot spots on standard cell pin connections early to reduce hot spots introduced by the router at the chip level, thereby reducing time and effort of a layout engineer (or IP designer) to resolve hot spots and shortening the design cycle time.

Figure 5:
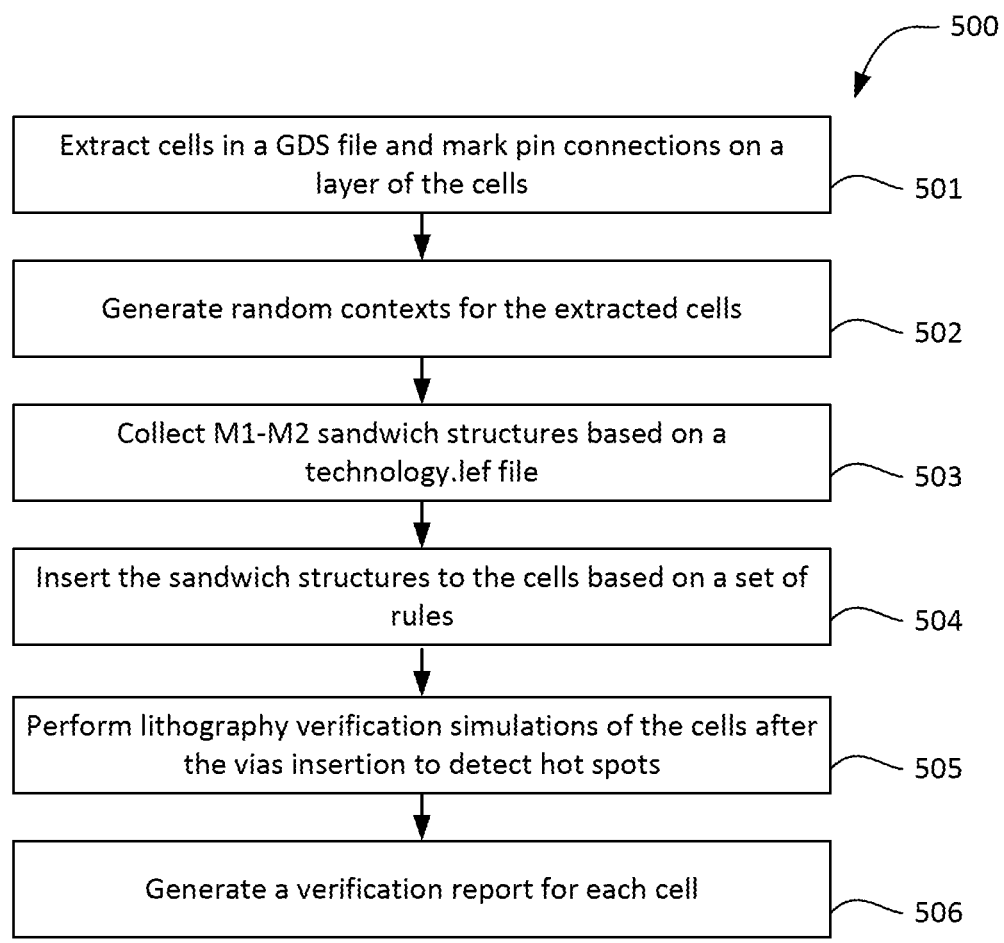
FIG. 5 is a flowchart of a method 500 for optimizing manufacturability of standard cells according to another embodiment of the present invention.

FIG. 5 is a flowchart of a method 500 for optimizing manufacturability of stand cells according to another embodiment of the present invention. Referring to FIG. 5, method 500 may include the following steps:

Step 501: extract the cells in an original GDS file and mark pin connections (pin nets) on a layout layer of the extracted cells.

Step 502: generate random contexts or user defined surrounding contexts for the cells in the original GDS file.

Step 503: collect all available metal 1-metal (2) (M1-M2) sandwich structures (via sandwich structures) based on a technology.lef file.

Step 504: insert the via sandwich structures to the cells based on a set of design rules.

Step 505: perform lithography verification simulations of the cells including the inserted sandwich structures to detect potential hot spots.

Step 506: generate a verification report for each cell.

In step 501, extracting the cells in a GDS file and marking pin connections on a layer or on all layers of the cells may be performed by cell extraction and pin connections generation module 301 (FIG. 3).

In step 502, the random contexts may be generated by context generation module 302.

In step 503, via sandwich structures may be collected by via generation module 303.

In step 504, inserting the via sandwich structures into the cells based on a set of design rules may be performed by via insertion deck module 304.

In step 505, lithography verification simulations of the cells including the inserted via sandwich structures may be performed by lithography verification module 305, which may also generates a verification report of each cell for a user to take corrective actions on the affected cells.

As used herein, the term "module" may be referred to an analog and/or digital electronic circuit, a combinational logic circuit, one or more processing units that can execute code, other suitable hardware components that provide the described functionality. The module may include memory that stores code executed by the one or more processing units. The term "code" may include software, firmware, microcode and may be referred to as programs, routines, functions that can be stored in a memory.

The methods and systems described herein may be partially or fully implemented by one or more computer programs executed by one or more processing units (processors). The computer programs include processor-executable instructions that are stored in a non-transitory tangible computer readable medium. Example of the non-transitory computer readable medium include non-volatile memory, volatile memory, magnetic storage, and optical storage.

Figure 6:
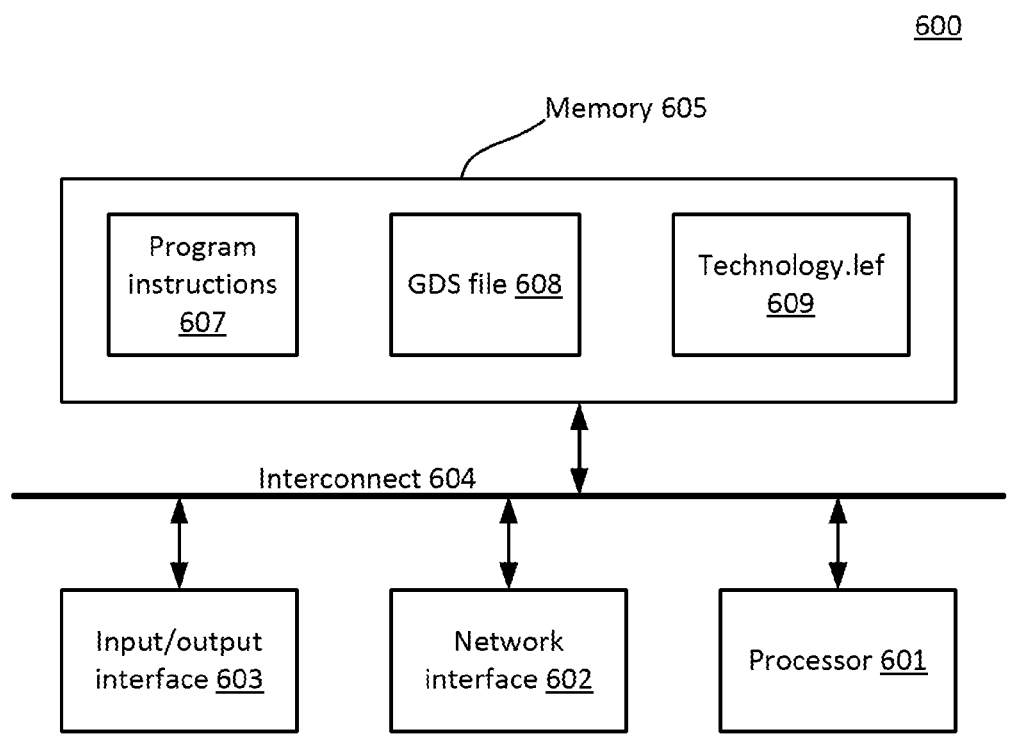
FIG. 6 is a computer system suitable for optimizing the standard cells manufacturability according to an embodiment of the present invention.

FIG. 6 is a computer system 600 suitable for optimizing the standard cells manufacturability according to an embodiment of the present invention. Computer system 600 may include a processor 601, a network interface 602, an input/output interface 603, an interconnect 604, and a memory 605. Processor 601 may include one or more processing units having one or more general-purpose CPU cores and/or special-purpose cores (hardware accelerators, digital signal processing units, etc.). Network interface 602 may be configured to perform any known network standards or proprietary network protocols. Input/output interface 603 may be configured to interface with a user and may include a touch-screen display, key board, mouse, and the like. The processor, the network interface, the input/output interface, and the memory can communicate with each other through the interconnect.

Memory 605 may include program instructions 607, a GDS file 608, and a technology.lef file 609. Although the program instructions, the GDS file, and the technology.lef file are shown to be included in the memory, they may be stored separately in different storage devices and remote from the computer system, and they are accessible by the computer system through the network interface.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for optimizing manufacturability of standard cells by a system including a context generation module, a via insertion deck module, and a lithography verification module, the method comprising:
   generating random contexts by randomly placing the standard cells in a file by the context generation module, each of the standard cells having one or more pin connections;
   inserting vias into the one or more pin connections of each of the standard cells by the via insertion deck module;
   performing a lithography verification on the standard cells after the vias have been inserted by the lithography verification module to locate weak spots.

2. The method of claim 1, further comprising, prior to generating the random contexts:
   extracting the standard cells from an original library;
   marking the one or more pin connections on a layer of each standard cell.

3. The method of claim 1, wherein
   the file is a GDS file.

4. The method of claim 1, wherein inserting the vias into the one or more pin connections of each of the standard cells comprises:
   generating a via insertion deck containing a plurality of via insertion rules for the vias;
   placing the vias on the one or more pin connections of each of the standard cells according to a set of design rules.

5. The method of claim 1, wherein inserting the vias into the one or more pin connections of each of the standard cells comprises:
   applying different via insertion rules in response to different wiring patterns.

6. The method of claim 1, wherein inserting the vias into the one or more pin connections of each of the standard cells comprises:
   selecting available vias from a technology file.

7. A system for optimizing manufacturability of standard cells, the system comprising:
   a context generation module configured to randomly place the standard cells in a file, each of the standard cells having one or more pin connections;
   a via insertion deck module configured to insert vias into the one or more pin connections of each of the standard cells; and
   a lithography verification module configured to perform a lithography verification to locate weak spots after the vias have been inserted.

8. The system of claim 7, further comprising:
   a cell extraction and pin connection generation module configured to extract the standard cells from an original library and mark the one or more pin connections on a layer of each standard cell.

9. The system of claim 7, wherein the file is a GDS file.

10. The system of claim 7, wherein the vias are inserted on the one or more pin connections of each of the standard cells according to a set of design rules.

11. The system of claim 7, wherein the vias are inserted on the one or more pin connections of each of the standard cells based on a wiring pattern.

12. The system of claim 7, further comprising a via generation module configured to select available vias for the one or more pin connections of each of the standard cells from a technology file.

13. The method of claim 1, wherein randomly placing the standard cells comprises:
   placing standard cells having short pin connections close to each other.

14. The method of claim 1, wherein randomly placing the standard cells comprises:
   placing standard cells having different functions close to each other.

15. The method of claim 1, wherein randomly placing the standard cells comprises:
   placing standard cells having same functions and with different input pins close to each other.

16. The system of claim 8, wherein the cell extraction and pin connection generation module is further configured to generate a standard cell record containing information about a number of pins associated with a metal layer for each of the standard cells.

17. The system of claim 7, wherein the context generation module is configured to place standard cells having short pin connections close to each other.

18. The system of claim 7, wherein the context generation module is configured to place standard cells having different functions close to each other.

19. The system of claim 7, wherein the context generation module is configured to place standard cells having same functions and with different input pins close to each other.

20. The system of claim 12, wherein the technology file is a library exchange format (LEF) file containing building blocks of the standard cells.

* * * * *